United States Patent Office 2,853,384
Patented Sept. 23, 1958

2,853,384

ANIMAL GROWTH STIMULANT

John R. De Zeeuw, Herbert G. Luther, and Frederick Sauer, Terre Haute, Ind., assignors to Chas. Pfizer & Co., Inc., Brooklyn, N. Y., a corporation of Delaware No Drawing. Application October 10, 1955
Serial No. 539,686

3 Claims. (Cl. 99—2)

This invention is concerned with a process for improving animal growth stimulating materials and with the improved products prepared by the novel process.

It has been disclosed in a recently filed copending patent application Serial No. 462,114, filed on October 13, 1954, by Herbert G. Luther et al. that an animal growth stimulating material may be prepared from streptomycin fermentation broth which has been substantially depleted of antibiotic by treatment of the fermentation broth with a carboxylic acid type ion-exchange resin. It has been observed that this material, that is, streptomycin-exhausted streptomycin broth or concentrates thereof, displays what appears to be a certain amount of toxicity when fed at high levels, despite its growth stimulating effect at low levels. By "high levels" is meant a concentration on the dry basis of at least about 1% and up to 5% or more of the total weight of the animal feed. By "low levels" is meant less than about 1% by weight.

The toxic effect found present in the streptomycin fermentation byproducts is, of course, very undesirable. It seems to prevent the full attainment of the maximum possible growth stimulation when the product is fed at low levels. It also presents a distinct danger in that high level feeding either deliberately or by accident may lead to injury or even death of the animal. The substantial decrease in the toxic factor brought about by the process of the present invention leads to better growth when the treated product is used at a low level and provides a safety factor guarding against injury to the animal due to accidental high-level feeding.

The present invention consists of a method of greatly decreasing the toxic effect which occurs on feeding these growth stimulating materials at a high level. The new process consists of treating the animal growth stimulating materials described above (which are normally obtained as acidic solutions or concentrates) at a neutral to alkaline pH, that is, at least about 7 and not greater than about 10 at an elevated temperature of at least about 40° C. and not greater than about 125° C., and for a time sufficient to substantially decrease the toxicity, which is at least 15 minutes but not greater than about 2 hours. A somewhat longer time does not hurt, but a considerably longer time may lead to a decrease in effectiveness of the product. The material is treated in aqueous solution or suspension. This may most conveniently be done by treating the filtered fermentation broth from which streptomycin has been substantially removed or a concentrate thereof with a suitable non-toxic alkaline material at the desired temperature for a time sufficient to substantially decrease the toxicity.

It should be realized that the rate of destruction of the toxic material or materials present in the growth stimulating streptomycin fermentation product depends on the relative time, pH, and temperature used in the treatment of the aqueous solutions or suspensions of these materials. These variables are all interdependent, that is, if the pH is raised, it may not be necessary to apply the treatment for as long a time or at as high a temperature. On the other hand, if the temperature is raised, the pH need not be as high nor the time as long to achieve an equal degree of removal of the toxicity. In all cases conditions are chosen which substantially decrease toxicity without greatly decreasing activity. The conditions may readily be standardized by observing the toxicity of the dried growth promoting materials when added to the diet of a rat. A high level of the dried material is used in the animal's feed, that is, on the order of about 5% of the total dry weight of an otherwise balanced feed is used, and the rate of growth as compared to standard animals of the same type and same size on an otherwise identical diet (without the treated fermentation product) is observed.

As noted above, a variety of conditions of temperature, time, and pH may be utilized. For instance, if a pH of about 8 is utilized and a temperature of 50° C., within one hour the toxicity encountered on high level feeding of a dried streptomycin-exhausted *Streptomyces griseus* broth is substantially decreased. In general, a temperature of at least about 50° C., a pH of at least about 7, and a time of at least about 15 minutes is used to achieve substantial improvement in quality of the product. In practice, a longer period may be desirable, such as one hour or more, up to a maximum of several hours. The pH should preferably not be greater than about 10. In adjusting the pH a variety of non-toxic alkaline agents may be used. These include bases such as sodium hydroxide, ammonium hydroxide, potassium hydroxide and calcium hydroxide; carbonates such as sodium carbonate, sodium bicarbonate, potassium carbonate and calcium carbonate, as well as basic salts such as sodium acetate and trisodium phosphate.

The following examples are given by way of illustration and are not to be regarded as a limitation of this invention, many variations of which are possible without departing from its spirit or scope.

*Example I*

An animal growth stimulating product was prepared by treating filtered streptomycin-containing *Streptomyces griseus* fermentation broth with the ion-exchange resin Amberlite IRC–50 (the trademark of Rohm & Haas Co. for a polymethacrylic acid-divinylbenzene copolymer in beadlet form) to remove the antibiotic. The residual solution was evaporated to a concentrate and drum dried. Sixty grams of this material was suspended in 100 milliliters of water. This mixture had a pH of 3.7. A second portion of the same material in water was heated at pH 3.7 for one hour at 100° C. A third portion was adjusted to pH 7 but not heated. A further portion was adjusted to pH 7 and then heated for one hour at 100° C. Five percent by weight of each of these suspensions of the growth stimulating material were added to a balanced diet fed to groups of rats. The weight of these animals was determined at regular intervals over a period of one week. At the end of this time, 100% of the rats receiving the unheated pH 3.7 material had died. Of the group receiving the material heated at pH 3.7, 20% had died. The survivors lost an average of 3.3 grams in weight per animal. In the case of the animals fed with the product adjusted to pH 7 but not heated, the average animal weight loss was 8.5 grams. However, the mateial that was adjusted to pH 7 and heated produced an average gain in weight per week of 39.2 grams as compared to the control (no added fermentation product) group's average gain in weight of 34.4 grams. This shows the great advantage in heating the growth stimulating materials at a pH of at least 7 to lower the toxicity of the growth stimulating material.

The basal ration used for feeding the control group and to which the growth stimulating materials treated in various ways were added has the following composition:

| | Percent |
|---|---|
| Yellow corn meal | 25.0 |
| Ground wheat | 20.0 |
| Soybean oil meal | 31.0 |
| Fish meal | 5.0 |
| Dried skim milk | 4.0 |
| Alfalfa leaf meal | 3.0 |
| Brewer's yeast | 3.0 |
| Dicalcium phosphate | 2.5 |
| Iodized salt | 1.0 |
| Vitamin mix | 0.5 |
| Beet pulp | 5.0 |

The beet pulp is replaced in the test diets by the material being evaluated. The vitamin mix contains 50,000 units of vitamin A, 150,000 units of vitamin D, 5300 units of vitamin E, 800 milligrams of riboflavin, 800 milligrams of thiamin, 1.6 grams of niacin, and 0.6 milligrams of vitamin B12 per 100 pounds of diet.

*Example II*

A substance effective in stimulating animal growth was prepared by treating streptomycin fermentation broth with a carboxylic acid type cation-exchange resin to remove practically all of the streptomycin but leaving any vitamin B12 present (which is, of course, of value in animal feeds). The residual liquid, which was substantially free of streptomycin, was concentrated to a syrup and dried under vacuum. Groups of one day old chicks were fed on (A) rations having the composition indicated below, (B) the same diet with 0.81% of the growth stimulating material described above and (C) the same growth stimulating material after treatment in aqueous suspension at a pH of 7, and a temperature of 50° C. for two hours. The three groups of chicks at the end of four weeks averaged in weight 386, 403, and 438 grams, respectively. The feed efficiency with these groups of chicks (the ratio of pounds of feed per pound of weight gain) was 2.22, 2.13, and 2.05, respectively. It is apparent from these figures that, although the addition of a growth stimulating streptomycin broth derived material caused a definite increase in weight gain in the chicks and definite increase in feed efficiency, the weight gain and feed efficiency were even greater when the growth stimulating material was treated as indicated above.

The standard basal chick ration used in this experiment had the following composition:

| | Percent |
|---|---|
| Corn, ground yellow | 60.3 |
| Soybean oil meal (44% solvent) | 33.0 |
| Alfalfa leaf meal (17%) | 1.0 |
| Dicalcium phosphate | 3.0 |
| Calcium carbonate | 1.0 |
| Salt, iodized | 0.2 |
| Vitamin, mineral, amino acid and antibiotic premix | (¹) |

¹ Furnishes the following per 100 lbs. of diet: 130 mg. riboflavin, 930 mg. dl-calcium pantothenate, 1400 mg. niacin, 130 mg. pyridoxine, 1 mg. vitamin B12, 22.7 g. choline chloride, 300,000 units vitamin A, and 25,000 units vitamin D, 0.50 g. Terramycin, 0.25 g. penicillin G (as the procaine salt), 8 g. manganese sulfate, and 22.7 g. dl-methionine.

*Example III*

Groups of chicks initially weighing about 50 g. per chick were fed on the basal diet described in the example directly above. To certain of these diets was added (A) 2.7% of a product derived from streptomycin fermentation broth by drying the solution left after removal of streptomycin with an ion-exchange resin, (B) 2.7% of this lot of material (A) treated at pH 8 at 70° C. for one hour, (C) 2.7% of a second lot of dried streptomycin-exhausted broth, (D) dried streptomycin exhausted broth (lot C) treated at pH 7.5 at 100° C. for one-half hour. In the following table is given the average weight of the chicks in each group at the end of four weeks, and the feed efficiency.

| Supplement | Average Weight | Feed Efficiency |
|---|---|---|
| None | 373 | 1.95 |
| 2.7% (A) | 379 | 2.04 |
| 2.7% (B) | 431 | 1.99 |
| 2.7% (C) | 358 | 2.02 |
| 2.7% (D) | 428 | 1.89 |

It is seen by examination of the above table that the treatment, according to the present process, of filtered streptomycin-depleted dried streptomycin broth definitely results in increasing the growth promoting effects.

What is claimed is:

1. A process for decreasing the toxicity of animal growth stimulating streptomycin-depleted streptomycin broth by-products which comprises treating said products at a pH of at least about 7 at an elevated temperature of at least about 40° C.

2. In a process for the preparation of an animal growth stimulating product from a streptomycin depleted broth, the step which comprises heating said material at a temperature of at least about 50° C. and at a pH of at least about 7 until the toxicity of said material is substantially reduced.

3. A process for the preparation of an improved animal growth stimulating material which comprises filtering streptomycin fermentation broth, removing streptomycin therefrom with a carboxylic acid-cation exchange resin, and treating the residual material at a pH of at least about 7 and at a temperature of at least about 50° C. for at least about 15 minutes.

References Cited in the file of this patent

Chemical Abstracts, 48 (1954), page 8988a, abstract from Japanese Patent No. 4024 (Aug. 19, 1953), 4 pages spec.